United States Patent
Brumovsky et al.

(10) Patent No.: US 9,418,431 B2
(45) Date of Patent: Aug. 16, 2016

(54) STRAIGHTNESS MEASUREMENTS OF LINEAR STOCK MATERIAL

(71) Applicant: Tenaris Connections Limited, Kingstown (VC)

(72) Inventors: Andrés Brumovsky, Buenos Aires (AR); Nicolás Bonadeo, Buenos Aires (AR); Ricardo Tejerina, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 722 days.

(21) Appl. No.: 13/720,347

(22) Filed: Dec. 19, 2012

(65) Prior Publication Data

US 2014/0168414 A1 Jun. 19, 2014

(51) Int. Cl.
*G06T 7/00* (2006.01)
*H04N 7/18* (2006.01)
*G01B 11/25* (2006.01)
*G01B 11/24* (2006.01)

(52) U.S. Cl.
CPC .............. *G06T 7/0057* (2013.01); *G01B 11/25* (2013.01); *H04N 7/18* (2013.01); *G01B 11/2408* (2013.01); *Y10T 29/49769* (2015.01)

(58) Field of Classification Search
CPC ........ G06T 7/0057; H04N 7/18; G01B 11/25; G01B 11/2408; G01B 11/24; G01B 11/2441; G01B 11/2513; G01B 11/2518; G01B 11/2522; G01B 11/2531; G01B 11/2536; G01B 11/254; Y10T 29/49769
See application file for complete search history.

(56) References Cited

U.S. PATENT DOCUMENTS

| | | | |
|---|---|---|---|
| 5,361,308 A * | 11/1994 | Lee | G01B 11/2441 348/131 |
| 5,617,645 A | 4/1997 | Wick et al. | |
| 7,110,910 B1 | 9/2006 | Deffenbaugh et al. | |
| 2003/0136195 A1* | 7/2003 | Krieg | G01N 29/07 73/628 |
| 2004/0257565 A1* | 12/2004 | Ishihara | G01B 11/24 356/364 |

FOREIGN PATENT DOCUMENTS

| | | | |
|---|---|---|---|
| JP | 61128112 A | | 6/1986 |
| JP | 2009068957 A | | 4/2009 |
| JP | 2010008345 A | * | 1/2010 |
| WO | WO2011151538 A1 | | 12/2011 |

* cited by examiner

*Primary Examiner* — Behrooz Senfi
*Assistant Examiner* — Maria Vazquez Colon
(74) *Attorney, Agent, or Firm* — Fish & Richardson P.C.

(57) ABSTRACT

Methods and systems for determining information about an object are described. In one aspect, a method includes illuminating an object with a plurality of lines of light, the lines being spaced-apart along an axis, and acquiring a sequence of images of the lines of light while rotating the object about the axis. The method further includes, for each image, determining a location of an extremum for each of the lines of light. Furthermore, the method includes establishing a reference line based on the location of the extrema for a first plurality of the lines, calculating a deviation between the extrema of a second plurality of the lines and the reference line, and determining information about the shape of the object based on the calculated deviations.

21 Claims, 10 Drawing Sheets

STRAIGHTNESS MEASUREMENTS OF LINEAR STOCK MATERIAL

BACKGROUND

This specification relates to technologies used to measure straightness of linear stock material, e.g., of pipe or tube stock and round bar stock materials.

There are several reasons to keep the end pipe straightness below certain tolerance value. For many applications, such as transport, this is done to facilitate pipe joining during pipe fabrication. For pipes that will be threaded, having straightness deviations that are outside of the prescribed tolerances can lead to threaded pipe ends that are out of spec, which can result in discharge of at least portions of these pipes. Mill operators can conduct visual inspections or manual measurements or both to determine whether straightness of portions of the linear stock material being fabricated by a pipe mill falls within the prescribed tolerances.

SUMMARY

The technologies disclosed in this specification can be used to measure straightness of linear stock material using non-contact laser triangulation. For example, the systems and techniques described in this specification can be used to measure straightness of pipe ends. For simplicity, examples of linear stock material used in this specification refer to pipes, however, the disclosed systems and techniques can be used to measure straightness of other objects in the category of linear stock material, such as tubes, round bars, wires, and the like.

In general, one innovative aspect of the subject matter described in this specification can be embodied in methods for determining information about an object. The methods include illuminating an object with a plurality of lines of light, the lines being spaced-apart along an axis, and acquiring a sequence of images of the lines of light while rotating the object about the axis. The methods further include, for each image, determining a location of an extremum for each of the lines of light. Furthermore, the methods include establishing a reference line based on the location of the extrema for a first plurality of the lines, calculating a deviation between the extrema of a second plurality of the lines and the reference line, and determining information about the shape of the object based on the calculated deviations.

These and other embodiments may each optionally include none, one or more of the following features. In some implementations, the object can be a pipe. For example, the pipe has an outer diameter of 10 mm or more. For instance, the outer diameter of the pipe can be in a range of 10-500 mm. As another example, the pipe has a length of 100 mm or more. For instance, the length of the pipe can be in a range of 0.1-50 m. As another example, the pipe has a temperature of up to 600 or 700 degrees Celsius while the images are acquired.

In some implementations, the object can be illuminated by diffracting a beam of light to form the lines of light. In some implementations, the lines of light can be incident on the object along directions that are non-normal to axis. In some implementations, the images are acquired every 20 degrees or less of rotation of the object about the axis. In some implementations, the images are acquired for a complete rotation of the object about the axis. In some implementations, when the object is a pipe, the information can include a measure of a hook end of the pipe. In some implementations, when the object is a cylindrical pipe, the information can include a measure of a deformation in the shape of the pipe. In some implementations, the information can include information about a defect in the object.

In some implementations, locating the extrema comprises mathematically fitting a curve to each of the lines and determining the location of an extrema of the fitted curve. For example, the curve includes one of a parabola or an ellipse. In some implementations, determining the information can include comparing, for different images, a deviation for at least one of the lines of light. In some implementations, determining the information can include calculating a maximum difference between the deviations of different images for at least one of the lines of light. In some implementations, determining the information can include establishing the deviation as a function of angular position of the object and determining a contribution to the deviation for different angular frequencies.

In some implementations, the methods can include, prior to acquiring the images, adjusting a position of the lines on the object and adjusting a field of view over which the images are acquired. For example, adjusting the position of the lines and adjusting the field of view includes varying a position of the object relative to a light source that provides the lines of light and a camera that acquires the images. In some implementations, the methods can include further processing the object based on the information. For example, when the object is a pipe, the information can include information about a defect in the pipe at or near an end of the pipe, e.g., bending of the pipe. In some implementations, the further processing can include removing the defect, e.g., by cutting the bent end of the pipe or correcting the bending. In other implementations, the further processing can include threading the end of the pipe.

Another innovative aspect of the subject matter described in this specification can be embodied a system for determining information about the shape of an object. The system includes a light source module comprising a light source; a camera module comprising a camera; a support fixture configured to position the object relative to the light source and the camera; and an electronic processing module in communication with the camera. During operation of the system the support fixture rotates the object about an axis, and the light source module illuminates the object with a plurality of lines of light, such that the lines are spaced-apart along the axis, and the camera acquires a sequence of images of the lines of light while the support fixture rotates the object about the axis. Further during the operation of the system the electronic processing module determines, for each image, a location of an extremum for each of the lines of light, and establishes a reference line based on the location in the images of the extrema for a first plurality of the lines. Furthermore during the operation of the system the electronic processing module calculates a deviation between the extrema of a second plurality of the lines and the reference line, and determines information about the shape of the object based on the calculated deviations.

These and other embodiments may each optionally include none, one or more of the following features. In some implementations, the light source module can include a diffraction grating positioned between the light source and the support fixture. The diffraction grating is structured to diffract light from the light source to provide the plurality of lines of light. In some implementations, the light source can be a laser light source. In some implementations, the camera module can include a filter positioned between the camera and the support fixture. The filter is structured to transmit light from the light source reflected from the object to the camera.

Another innovative aspect of the subject matter described in this specification can be embodied a method for manufacturing a pipe. The method includes providing a pre-processed pipe extending along a pipe axis, and illuminating the pre-processed pipe with a plurality of lines of light, the lines being spaced-apart along the pipe axis. The method further includes acquiring a sequence of images of the lines of light while rotating the pre-processed pipe about the pipe axis, and, for each image, determining a location of an extremum for each of the lines of light. Furthermore, the method includes determining information about the shape of the pre-processed pipe based on the extrema, and processing the pre-processed pipe based on the information.

Particular embodiments of the subject matter described in this specification can be implemented so as to realize one or more of the following advantages. The techniques described in this specification use measurement points that are acquired concurrently with reference points to obtain information about pipe straightness. In addition, components of the disclosed measurement systems (e.g., a laser and a camera) can be arranged to prevent relative movement thereof. In this manner, results of the disclosed measurement technologies may not be affected by pipe movement/misalignment relative to the measurement system during the straightness measurement. The latter characteristic makes the measurement system useful for in-line mill pipe straightness measurements.

Further, the disclosed measurements of pipe straightness can be performed more accurately, quickly and safely than conventional manual measurements. For instance, straightness of elongated pipe surfaces can be measured using the disclosed technologies in situations where the temperature of the pipe surface would be too high for an operator to safely perform manual inspection. For instance, after a pipe lamination operation, pipes can be transported to a storage location by means of an incline. In this manner, the pipes rotate while descending over the incline and, as such, the rotating pipes are cooled by fresh ambient air. The surface temperature of the pipe ends may be up to 600-700° C. during the foregoing rotation. In certain cases, the pipe external surface may also be subject to high levels of humidity. The disclosed technologies can be used to measure straightness of the pipes during this cooling operation. As such, the systems and techniques described in this specification can reduce the time between pipe fabrication and the time when information needed to feedback the straightening process is gathered.

Furthermore, the disclosed measurements can be performed without having to perform a reference scanning of the sample prior to the sample measurement. Additionally, results of the described measurements can be independent of the quality of supports and guides on which the pipes to be measured are supported. In addition, the robustness of the disclosed measurement system to camera/laser misalignment and the relative nature of the disclosed measurement relaxes the need for continuous calibration of the measurement system, such that calibration is only needed in extreme cases. The simplicity of the disclosed measurement process allows for the disclosed measurement system to be installed online for measuring 100% of the pipes. Moreover, as the pipes may have many uses, there are many standards for pipe end measurements that determine the length to be measured. The disclosed measurement system can accommodate several measurement lengths.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The technologies disclosed in this specification can be used to measure straightness of linear stock material using a measurement process based on non-contact laser triangulation. For example, the systems and techniques described in this specification can be used to measure straightness of pipe ends. It is important to quantify pipe end straightness to insure, for example, that threading of the pipe ends can be carried out. Pipes determined to have pipe ends that are not straight can be either discarded or straightened prior to threading.

Figure 1:
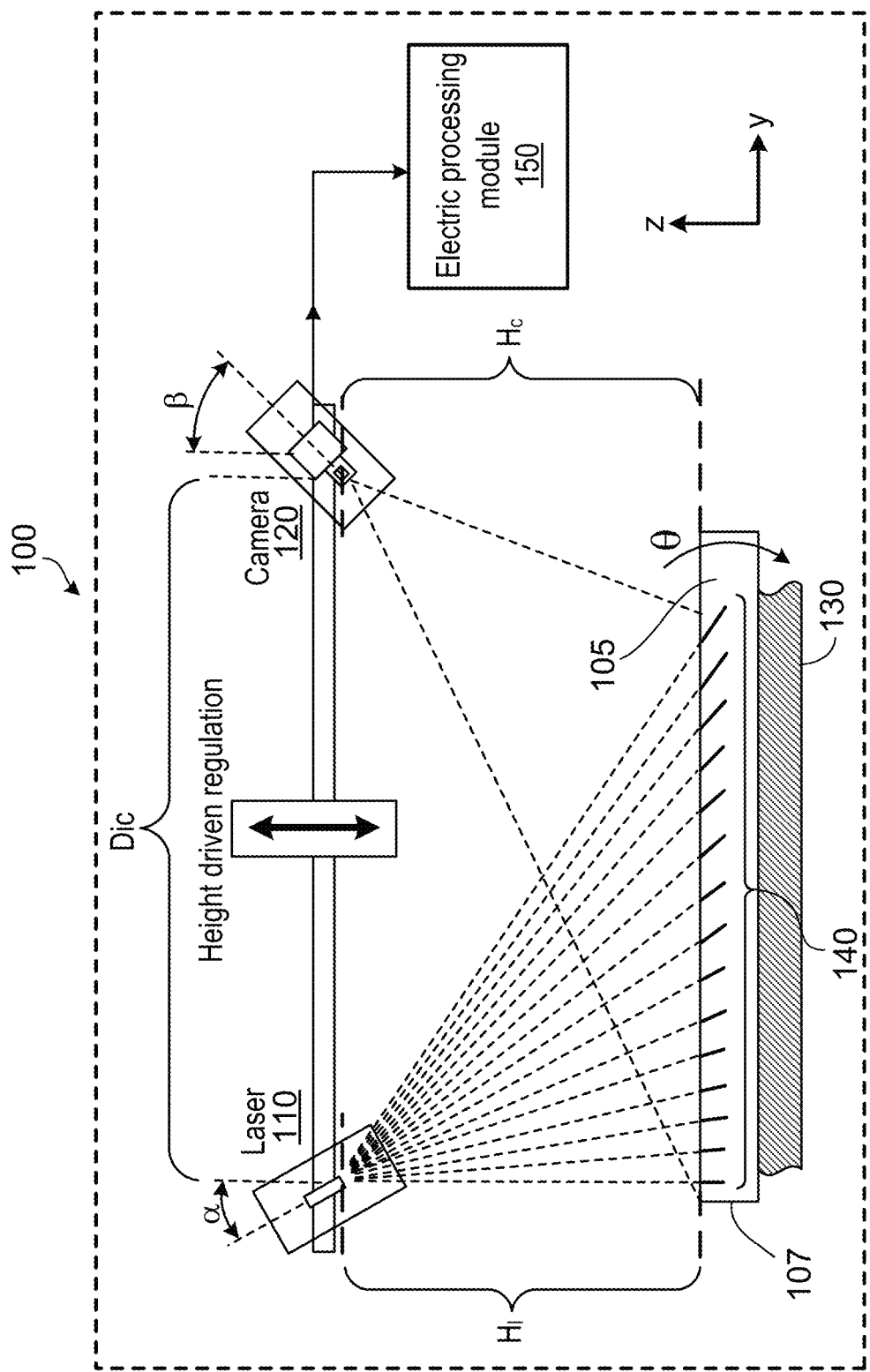
FIG. 1 shows an example of a system for measuring straightness of an object.

Referring to FIG. 1, in which a Cartesian coordinate system is shown for reference, a system 100 for measuring straightness of an object, e.g., a surface of linear stock material such as a pipe surface, can include a light source module (e.g., a laser light module) 110, an image acquisition module (e.g., a camera module) 120 placed apart from the light source module 110 on a support 125, a support fixture (e.g., a mount or a stage) 130 to hold the object, and an electronic processing module 150 to process images acquired by the image acquisition module 120. The camera of the image acquisition module 120 can include, for example, a charge-coupled device, a CMOS device, etc. A surface 105 of the object can be oriented along the y-axis, and the support fixture 130 can be configured to rotate the object about the y-axis. Although the system 100 can be used to measure straightness of many objects in the category of linear stock material, the implementation of the measurement system 100 described in connection with FIGS. 1-5 is configured for measuring straightness of a pipe surface 105 adjacent to a pipe end 107.

The laser of the light source module 110 and the camera of the image acquisition module 120 can be mounted on the support 125 at a predetermined distance $D_{lc}$. A camera angle $\beta$ and a laser angle $\alpha$ can be adjusted as necessary based on a size of a pipe to be measured, for instance. The camera angle $\beta$ can be configured to see (capture) all the laser lines 140 projected onto the pipe surface 105, and the laser angle $\alpha$ is configured to cover the pipe surface 105 where it is intended to verify the straightness, e.g., at least near the pipe end 107. The camera of the image acquisition module 120 and the laser of the light source module 110 can be placed at distances $H_c$ and $H_l$, respectively, from the pipe surface 105, as measured in the z-direction. In some situations, the camera of the light source module 120 and laser of the light source module 110 can be supported at the same height, $H_c=H_l$, with respect to the pipe surface 105, while in other situations the camera and laser heights may be different, $H_c \neq H_l$. This aspect of the measurement system 100 allows for adjusting the relative distances of the camera, $H_c$, and of the laser, $H_l$, with respect to the pipe surface 105, to accommodate measurements of pipes of various diameters, and to have the flexibility to change/replace one or more of the components contained by the measurement system 100 (e.g. camera lens, laser diffractive optics, etc.)

The laser of the light source module 110 includes or is coupled to diffractive optics to project a pattern of parallel lines 140 onto the surface of the pipe 105 adjacent to the pipe end 107. The lines 140 are projected on the pipe surface 105 in transverse orientation (e.g., along the x-axis) with respect to a longitudinal axis of the pipe (e.g., the y-axis). In some implementations, the projected lines 140 span an arc of about 60° of the circumference of the pipe surface 105, or equivalently, a length of the projected lines is about half the outer diameter of the pipe. For example, a measurement system 100 used to measure pipes with outer diameters between 100-500 mm is configured to project lines that are between 50-250 mm long. Moreover, in some implementations, the lines 140 are projected on the last 450 mm adjacent to the pipe end 107, with the first line being at about 30 mm from it. In some implementations, the separation of the projected lines 140 is about 30 mm. In some implementations, the image acquisition module 120 can include a filter positioned between the camera and the support fixture 130, where the filter is structured to transmit light from the light source reflected from the object to the camera. For instance, the filter can be a bandpass filter centered on a color of the light from the light source.

Once (i) the relative distance $D_{lc}$ between the camera of the image acquisition module 120 and the laser of the light source module 110, (ii) the camera height relative to the pipe surface Hc, (iii) the laser height relative to the pipe surface Hl, (iv) the camera angle β, and (v) the laser angle α are adjusted, such that the lines 140 projected on the pipe surface 105 are captured within the camera's field of view (prior to the system 100 performing a first pipe straightness measurement), no further adjustments of these geometrical parameters (i)-(v) of the system 100 are necessary as the pipe surface 105 is rotated about its longitudinal axis-y, by the support fixture 130, in order for the system 100 to perform subsequent pipe straightness measurements as a function of rotation angle θ.

Figure 2:
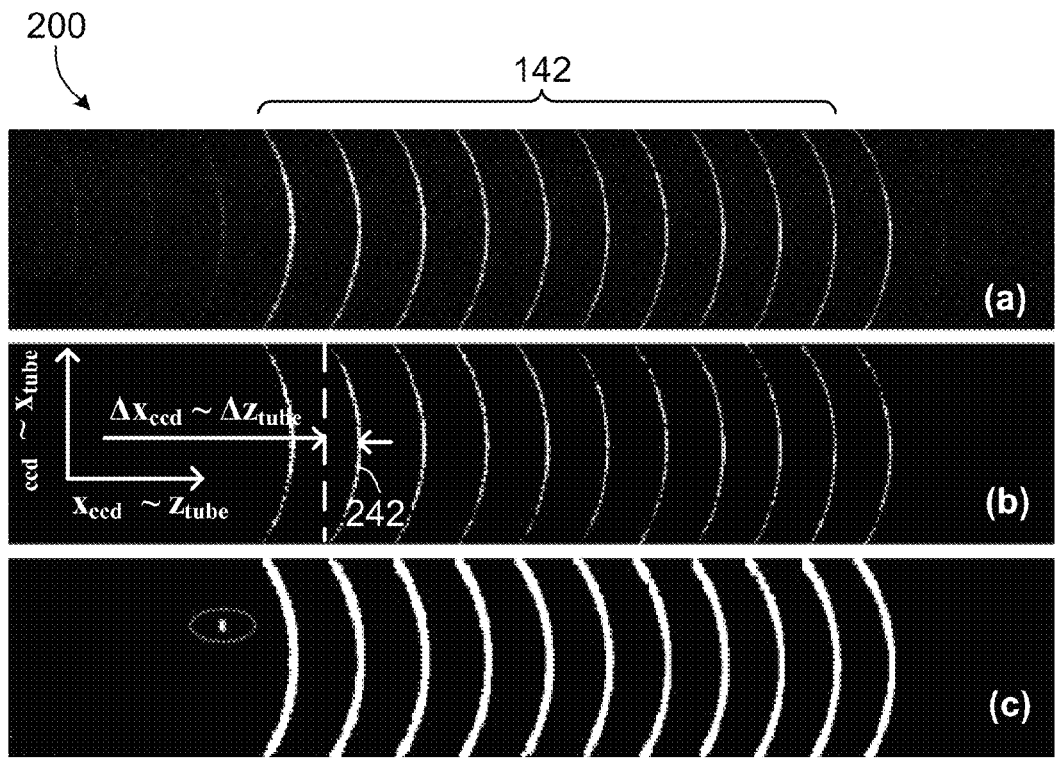
FIG. 2 shows image processing aspects of the system for measuring straightness of the object.
Figure 3:
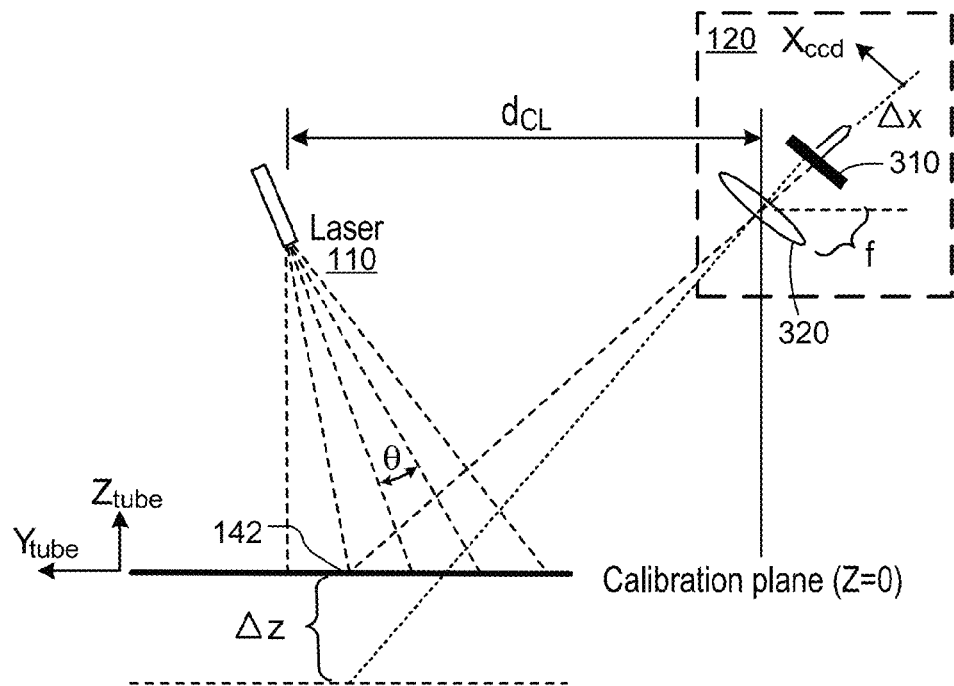
FIG. 3 shows calibration aspects of the system for measuring straightness of the object.

Turning now to FIGS. 2 and 3, FIG. 2 shows three instances, (a), (b) and (c), of an image 200 that was acquired by the camera of the image acquisition module 120. The lines 140 projected by the laser of the light source module 110 onto the pipe surface 105 are depicted in the image 200 as a sequence of conic section curves 240. FIG. 2 also shows for reference a Cartesian coordinate system associated with a CCD (denoted in FIG. 3 by numerical reference 310). Note that an x-direction in the coordinate system associated with the CCD 310 corresponds to a z-direction in a coordinate system associated with the pipe surface 105, $X_{ccd} \sim Z_{tube}$. In addition, a y-direction in the coordinate system associated with the CCD 310 corresponds to an x-direction in a coordinate system associated with the pipe surface 105, $Y_{ccd} \sim X_{tube}$.

The image instance (a) represents the image 200 as acquired by the camera of the image acquisition module 120. The image instance (b) represents the image 200 after background suppression and further binarization, for instance. The curves 240 (shaped as ridges, e.g., having a base at 0-grey levels—corresponding to black and representing, in this case, the image background—and a peak at 256-grey levels—corresponding to white and representing, in this case, the peak of the brightest ridge—on an 8-bit grey-scale) can be detected in the instance (b) of the image 200 by conventional methods of image processing, as described in detail below (see, FIG. 12 and corresponding discussion). For instance, line centers can be identified as the maximum of the ridges. The image instance (c) represents a mask used for selecting the valid pixels in (b), where x/y pixel pairs corresponding to the projected laser lines are set to 1 (white) and all other pixels of the image 200 are set to 0 (black) on a 2-bit scale. Once the x/y pixel pairs on the CCD 310 corresponding to centers of a curve are obtained, the curve can be fitted (e.g., to a quadratic or ellipse form) and the maximum of the fitted curve can be calculated as the maximum of the curve. Shape parameters of the curves 240 can be determined (e.g., separations between the curves, maxima of the curves, etc.) and can be used for calibrating of the system 100 and/or for measuring straightness of pipe surfaces 105.

FIG. 3 shows aspects of a calibration procedure performed to determine a relationship between height variation, $\Delta Z_{tube}$, between the pipe surface 105 and the support 125 on which the laser of the light source module 110 and the camera of the image acquisition module 120 are mounted, and the variation of lines maximums, $\Delta X_{ccd}$, projected onto the image sensor 310. In the example illustrated in FIG. 3, a geometrical connection between $\Delta Z_{tube}$ of an arbitrary laser line 142 and the corresponding $\Delta X_{ccd}$ for an arbitrary curve is shown. The system 100 can be calibrated by measuring a straight pipe, for instance.

Figure 4:
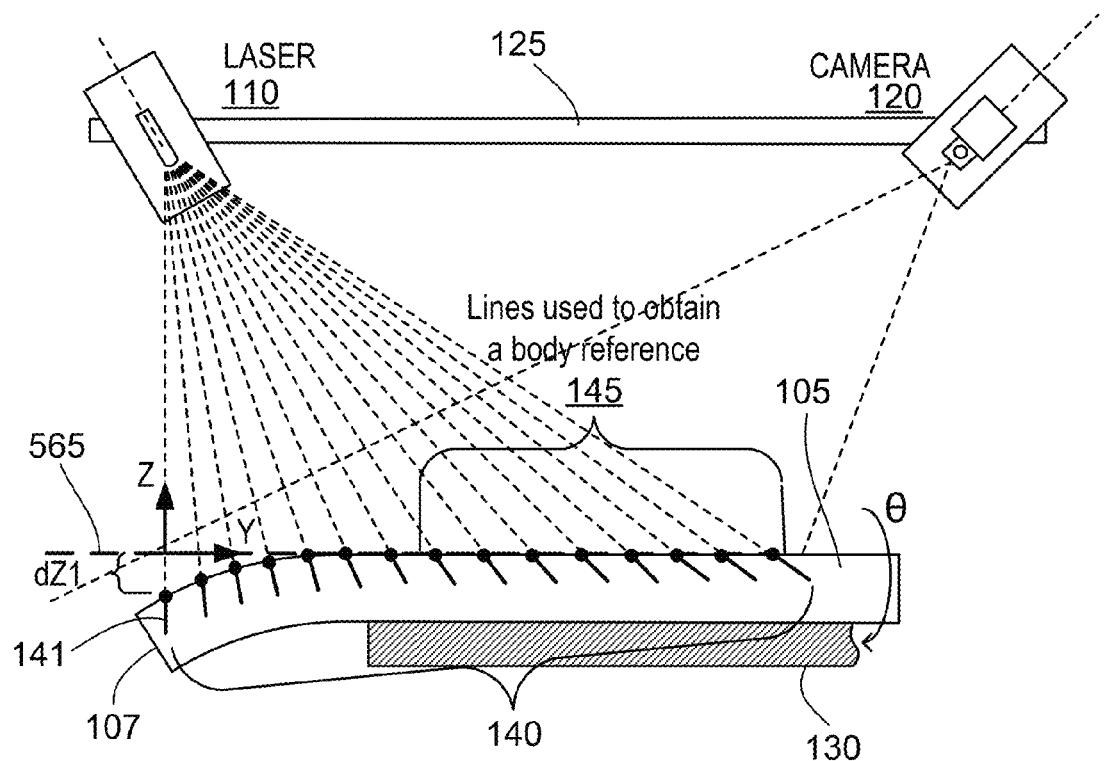
FIG. 4 shows measurement aspects of the system for measuring straightness of the object.

FIG. 4 shows aspects of a determination of a "hook end" value. The term hook end has been chosen due to the characteristic shape of the pipe surface 105 near the pipe end 107. The determination of the hook end value can be performed by the electronic processing module 150. As described above in connection with FIG. 3, the measurement system 100 can be calibrated to obtain a relation between maximums of curves 240 (depicted on the image sensor 310 along the coordinate $X_{ccd}$) to height (distance along the coordinate $Z_{tube}$) from the pipe surface 105 to the support 125 that holds the laser of the light source module 110 and the camera of the image acquisition module 120. A group 145 of the lines 140 (e.g., the last eight lines from the pipe end 107 of fifteen total lines) projected on the pipe surface 105 can be used to fit a reference line 565 for the pipe body. For example, the reference line 565 is a best fit, $Z_{fit}=Z(Y)$, to the points $\{(Y9, Z9), (Y10, Z10), \ldots, (Y15, Z15)\}$, which represent positions in the Y-Z coordinate system of the maximum of the $9^{th}, 10^{th}, \ldots, 15^{th}$ lines 145 of the pipe surface 105. In this manner, displacements of other lines near the pipe end 107 (e.g., the first line 141, or another line of the first five lines) to the body reference line 565 can be evaluated.

A hook end value associated with a rotational orientation of the pipe surface 105 illustrated in FIG. 4 can be obtain in terms of a deviation $\Delta Z$ of a maximum of a given laser line projected near the pipe end 107 from the body reference line 565. Note that this hook end value $\Delta Z$ should be specified along with a location Y of the given line relative to the pipe end 107. In the example illustrated in FIG. 4, the hook end value at a location Y1 of the first line 141, relative to the pipe end 107, is the deviation ΔZ1 of the maximum of the first line 141 from the linear fit 565.

Figure 5:
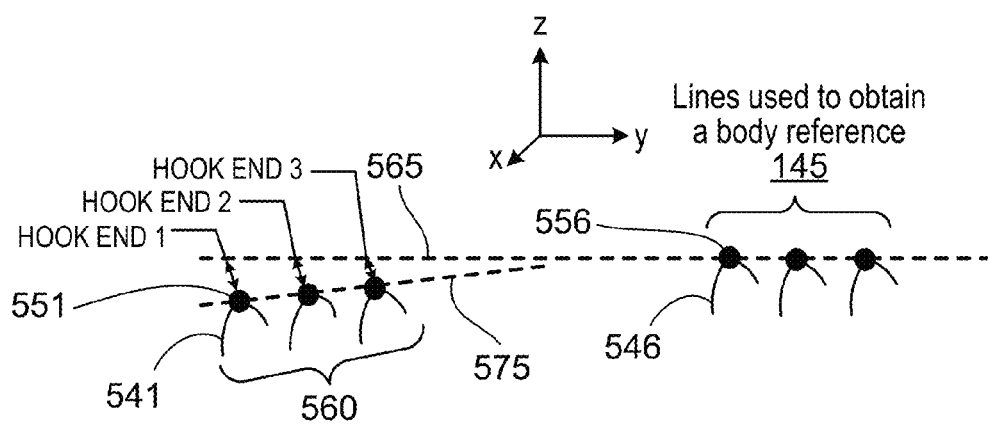
FIG. 5 shows other measurement aspects of the system for measuring straightness of the object.

FIG. 5 shows a representation of the laser lines 140 projected onto the pipe surface 105. In this representation, the vertical axis, z, represents the height of the pipe surface 105 with respect to a coordinate system associated with the pipe surface 105. The curves shown in FIG. 5, corresponding to the laser lines 140 and to the imaged curves 240, are grouped in a first group of curves 545 corresponding to (e.g., last 8 of 15 total) laser lines projected on a portion of the pipe surface 105 corresponding to the pipe body, and a second group of curves 560 corresponding to (e.g., first 5 of 15 total) laser lines projected on a portion of the pipe surface 105 near the pipe end 107. Maxima of the curves 145 (e.g., maximum 556 of curve 546, etc.) are used by the electronic processing module 150 to establish a body reference line 565. The body reference line 565 can be obtained as a linear fit of the maximums of the first group of curves 545. Additionally, the electronic processing module 150 can calculate, as described above in connection with FIG. 4, a first hook end value as the deviation of the maximum 551 of the first curve 541 from the linear fit 565 at a location of the first curve 541, relative to the pipe end 107. Similarly, a second (third) hook end value can be calculated by the electronic processing module 150 as the deviation of the maximum of the second (third) curve from the linear fit 565 at a location of the second (third) curve, relative to the pipe end 107.

Moreover, maxima of the curves 560 (e.g., maximum 551 of curve 541, etc.) can determine a pipe end reference line 575. The pipe end reference line 575 can be established by the electronic processing module 150 as a linear fit or a second order fit of the maxima of the second group of curves 560. In this manner, the reference lines 565 and 575 can be used by the electronic processing module 150 to calculate the hook end value of a pipe, e.g., as a distance of the pipe end reference line 575 to the body reference line 565, at a given distance Y from the pipe end 107.

In general, a "true" hook end value for a pipe represents the largest deviation $\Delta Z_0$ from among deviations {ΔZ(1), ..., ΔZ(M)} of maxima of M instances of a given curve (near the pipe end 107 with respect to a body reference line 565, at a location Y of the given curve, relative to the pipe end 107), where the M instances of the given curve correspond to M angular rotations {θ(1), ..., θ(M)} of the pipe surface 105. In order to determine the true value of the hook end for the pipe as the largest deviation, the support fixture 130 can rotate the pipe, and the camera of the image acquisition module 120 can acquire images of the laser lines 140 at multiple rotation increments, M. For instance, the support fixture 130 illustrated in FIGS. 1 and 4 can include an encoder coupled to a V-roll conveyor. Such implementation of the support fixture 130 can be used to support and rotate the pipe surface 105 while maintaining (or not) a constant rotation velocity. The deviations {ΔZ(j), j=1, ... M>2} can be calculated for each of M acquired frames. The total number of acquired image frames can be M=3, 6, 9, 30, 60, 90, ..., such that an image frame is acquired for angular increments of 120°, 60°, 40°, 12°, 6°, 4°, ..., respectively. For example, an image frame is acquired for each of 72 increment turns of 5° over a full rotation of the pipe surface 105. As a typical integration time of the camera is below 5 ms, the pipe need not be at rest when an image frame is acquired. In this manner, the 72 image frames can be acquired, e.g., at a rate of 30 frames per second, in 2.4 seconds without stopping rotation of the pipe.

FIGS. 6-10 show graphs 580 that represent deviations ΔZ (from a body reference line 565 of a given line projected near the pipe end 107) as a function of rotation angle, for multiple shapes/deformations of the pipe surface 105 near the pipe end 107. A graph 580 includes a number M of deviations ΔZ(j) of the pipe end 107, where j=1, ..., M. Each of the M deviations ΔZ(j) is measured using the system 100, as described above in connection with FIGS. 4-5, and corresponds to an image of the laser lines 140 projected on the pipe surface 105 near the pipe end 107 as acquired by the camera of the image acquisition module 120 when the support fixture 130 rotates the pipe surface 105 by an angular increment Δθ=360°/M. For example, when M=60, the angular increment Δθ=6°. In addition to the graph 580, each of the FIGS. 6-10 shows two views of a pipe. A first view, in the x-z plane, illustrates a pipe end 107. A second view, in the z-y plane, illustrates a lateral surface 105.

Figure 6:
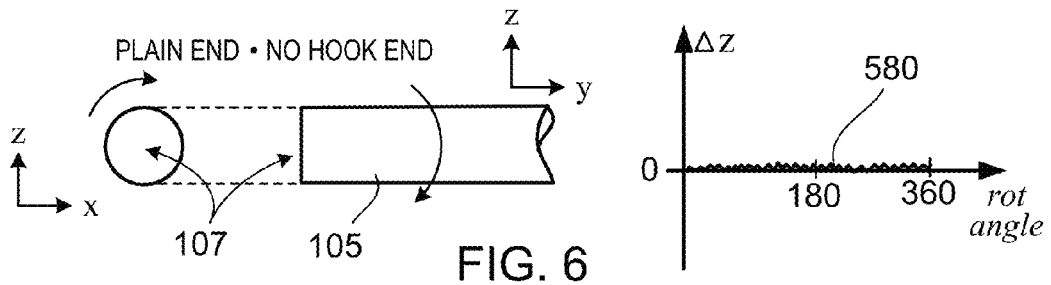
FIGS. 6-10 show examples of pipe end configuration and corresponding measurement results obtained by using the system for measuring straightness of the object.

FIG. 6 shows a pipe with a plain end that is straight (e.g., the pipe surface 105 has no hook end.) In this example, the graph 580 shows that the deviation ΔZ measured as a function of rotation angle is substantially constant and has a value of substantially zero (within measurement precision). In this case, the hook end value associated with the pipe having the plain end is zero.

Figure 7:
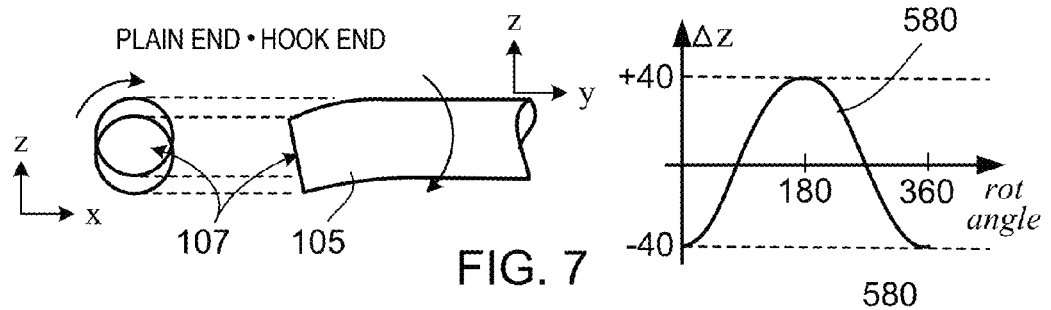

FIG. 7 shows a pipe with a plain end that has a hook end. In this example, the graph 580 shows that the deviation ΔZ measured as a function of rotation angle swings from negative deviation values to positive deviation values and back to the negative deviation values, as the lines projected on the portion of the pipe surface 105 near the pipe end 107 start below the body reference line 565, rise above it, and drop back below the body reference line 565 during a full rotation of the pipe. The hook end value associated with the pipe having the plain end can be calculated by the electronic processing module 150 as the range of measured deviations: $\Delta Z_{Max} - \Delta Z_{Min}$.

Figure 8:
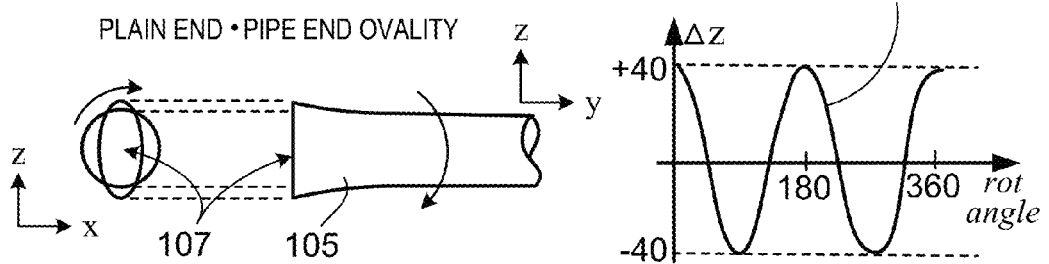

FIG. 8 shows a pipe for which the portion of the pipe surface 105 adjacent to the pipe end 107 is plain (e.g., it is un-processed) and has an oval profile. In this example, the graph 580 shows that the deviation ΔZ measured as a function of rotation angle swings from positive deviation values to negative deviation values and back to the positive deviation values twice, as the lines projected on the portion of the pipe surface 105 near the pipe end 107 drop below and then rise above the body reference line 565, a couple of times during a full rotation of the pipe. A hook end value cannot be defined in this case, however a measure of the ovality of the pipe surface 105 near the pipe end 107 can be calculated by the electronic processing module 150 as the range of measured deviations: $\Delta Z_{Max} - \Delta Z_{Min}$. Additional measures for the ovality of the pipe surface 107 can be calculated by the electronic processing module 150 using a Fourier analysis of the graph 580, as described below in connection with FIGS. 19-20.

Figure 9:
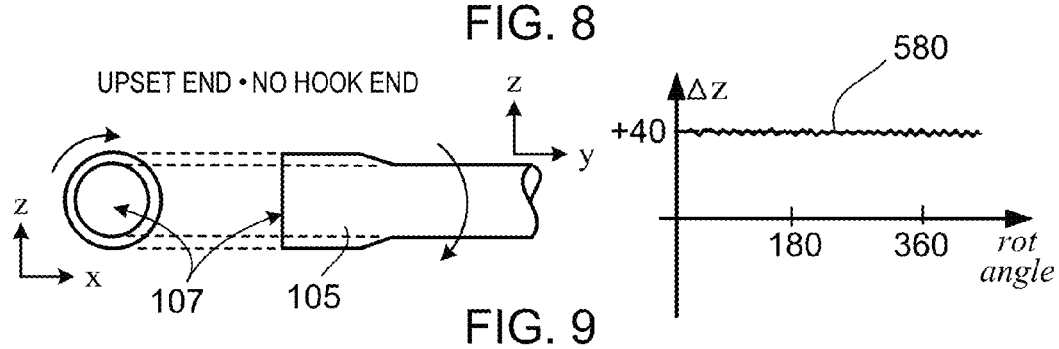

FIG. 9 shows a pipe for which the portion of the pipe surface 105 adjacent to the pipe end 107 is upset (e.g., it is heated and, therefore, dilated) and straight (e.g., it has no hook end.) In general, upsetting is a forging process that makes for a thicker wall on the pipe ends compared to the mid-portion of the pipe. The pipe ends are heated to a near liquid state. Each one of the heated end is then placed in an upsetter machine and held in a clamp. The machine is engaged and it strikes the end of the tube with a force that causes the metal to flow backwards a few inches. In this example, the graph 580 shows that the deviation ΔZ measured as a function of rotation angle is substantially constant (within measurement precision) and has a finite, non-zero value. In this case, the hook end value associated with the pipe having the upset end is zero.

Figure 10:
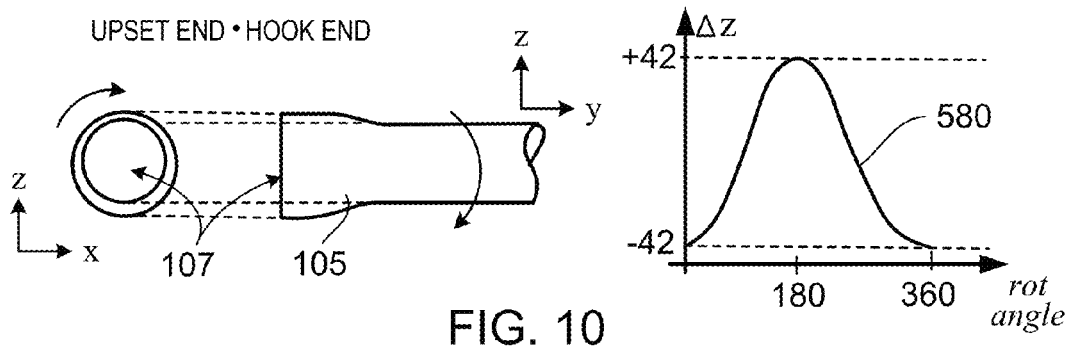

FIG. 10 shows a pipe for which the portion of the pipe surface 105 adjacent to the pipe end 107 is upset (e.g., it is heated and, therefore, dilated) and has a hook end. In this example, the graph 580 shows that the deviation ΔZ measured as a function of rotation angle swings from a first deviation value to a second deviation value and back to the first deviation value, as the lines projected on the portion of the pipe surface 105 near the pipe end 107 start at a first distance (positive or negative) from the body reference line 565, move to a second distance from it, and return back to the first distance from the body reference line 565 during a full rotation of the pipe. The hook end value associated with the pipe having the upset end can be calculated by the electronic processing module 150 as the range of measured deviations: $\Delta Z_{Max} - \Delta Z_{Min}$.

It should be noted that when the system 100 described above in this specification in connection with FIGS. 1-3 undergoes, after calibration, modifications of camera and laser heights of +/−20 mm ($H_c$ and $H_l$) with respect to the plane of calibration, the variations in the measured hook end remain lower than 1 μm. In addition, angle variations of +/−1° for the laser and camera angles, α and β, or variations of +/−20 mm of the distance between the laser and camera, $D_{lc}$, can cause variations in the measured hook end that are below 60 μm.

Figure 11:
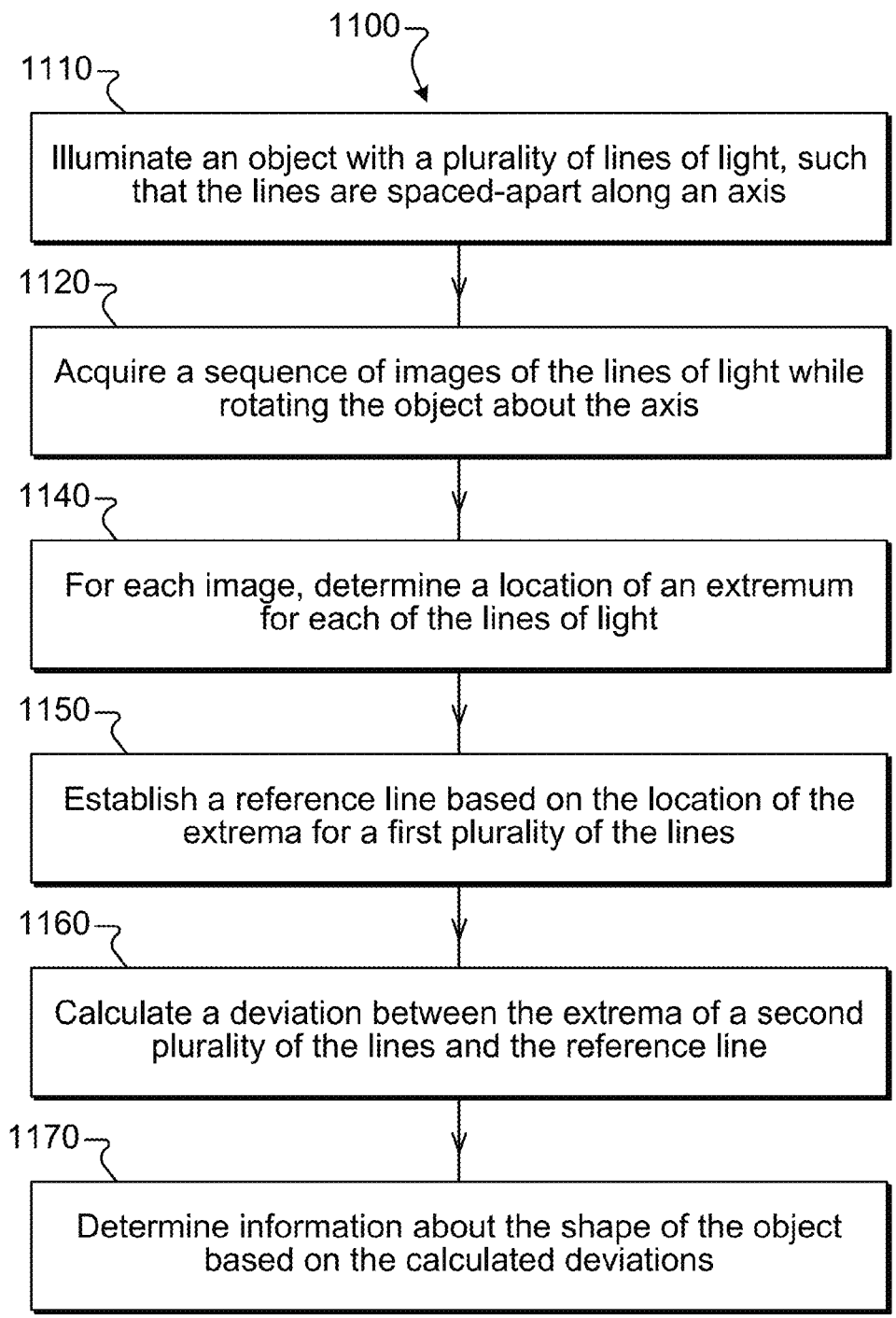
FIG. 11 is a flow chart of an example of a process for measuring straightness of an object.

FIG. 11 is a flow chart of an example of a process 1100 used to measure straightness of on object, e.g., of linear stock materials. The measurement process 1100 can be implemented, for example, using the system 100 described above in this specification in connection with FIGS. 1-3.

At 1110, an object is illuminated with a plurality of lines of light, such that the lines are spaced-apart along an axis of the object. In some implementations, the object can be a pipe, a tube, a rod, a wire, or other linear stock material. In some cases, the pipe can have an outer diameter of 10 mm or more, and a length of 0.1 m or more. For example, the length of the pipe can be in a range from 0.1 m to about 50 meters. In some implementations, the object can be illuminated by diffracting a beam of light to form the lines of light. Moreover, the lines of light can be incident on the object along directions that are non-normal to axis.

At 1120, a sequence of images of the lines of light is acquired while rotating the object about the axis. In some implementations, the object (e.g., the pipe) can have a temperature of up to 600-700° while the images are acquired. The images can be acquired every 20 degrees or less of rotation of the object about the axis. Also, the images are acquired for a complete rotation of the object about the axis. In some implementations, a set up procedure can be used prior to acquiring the images. Such set up procedure can include adjusting a position of the lines on the object and adjusting a field of view over which the images are acquired. Moreover, adjusting the position of the lines and adjusting the field of view can include varying a position of the object relative to a light source that provides the lines of light and a camera that acquires the images.

At 1140, for each image, a location of an extremum is determined for each of the lines of light. In some implementations, the extrema can be located by mathematically fitting a curve to each of the lines and determining the location of an extrema of the fitted curve. For example, the fitted curve can include one of a parabola or an ellipse.

At 1150, a reference line is established based on the location of the extrema for a first plurality of the lines. For example, the first plurality of lines can be located at 50 cm from a nearest end of the object as measured along the axis.

At 1160, a deviation between an extremum of each of a second plurality of the lines and the reference line is calculated. The second plurality of lines is located between the location of the first plurality of lines and the end of the object nearest to the first plurality of lines. As the reference line is established at 1150 for each of the acquired images, the deviation calculated at 1160 for a given image corresponds to the straightness of the object for an associated rotation angle at which the given image was acquired. Accordingly, the straightness measurements performed using the process 1100 can be immune to roll misalignment or movement of the pipe surface 105 relative to the light source and the camera because the combination of operations at 1150 and 1160 are performed image by image. In this manner, the process 1100 can be used to measure straightness of 100% of the pipe ends in mill cycle time.

At 1170, information about the shape of the object is determined based on the calculated deviations. If the object is a pipe, the information can include a measure of a hook end of the pipe, as described in this specification in connection with FIGS. 4, 5, 7, 10, 17 and 18. In some implementations, the information can include information about a defect in the object, as described below in connection with FIG. 14. In some implementations, determining the information can include comparing, for different images, a deviation for at least one of the lines of light, as described in this specification in connection with FIGS. 4 and 5. In other implementations, determining the information can include calculating a maximum difference between the deviations of different images for at least one of the lines of light, as described in this specification in connection with FIGS. 7, 10 and 13. In some other implementations, determining the information can include establishing the deviation as a function of angular position of the object and determining a contribution to the deviation for different angular frequencies, as described in this specification in connection with FIGS. 6-10, 17 and 18.

In some implementations, the object can be further processed based on the information determined at 1170. For instance, when the object is a pipe and the information determined at 1170 indicates that no defect is present at or near an end of the pipe, the next pipe fabrication operation can include threading the end of the pipe. However, in case the information determined at 1170 includes indication about a defect at or near an end of the pipe, then the pipe can be routed to an additional operation of removing the defect prior to threading the end of the pipe.

The straightness measurements performed by using the process 1100 can be operator independent. In addition, results of the straightness measurements performed using the process 1100 can provide extra process variables that may be useful for controlling a pipe fabrication process. For instance, if the object is a cylindrical pipe, the information determined at 1170 can include a measure of a change in an ovality of a cross-section of the pipe end with respect to a reference cross-section, as described in this specification in connection with FIGS. 8, 19 and 20.

Figure 12:
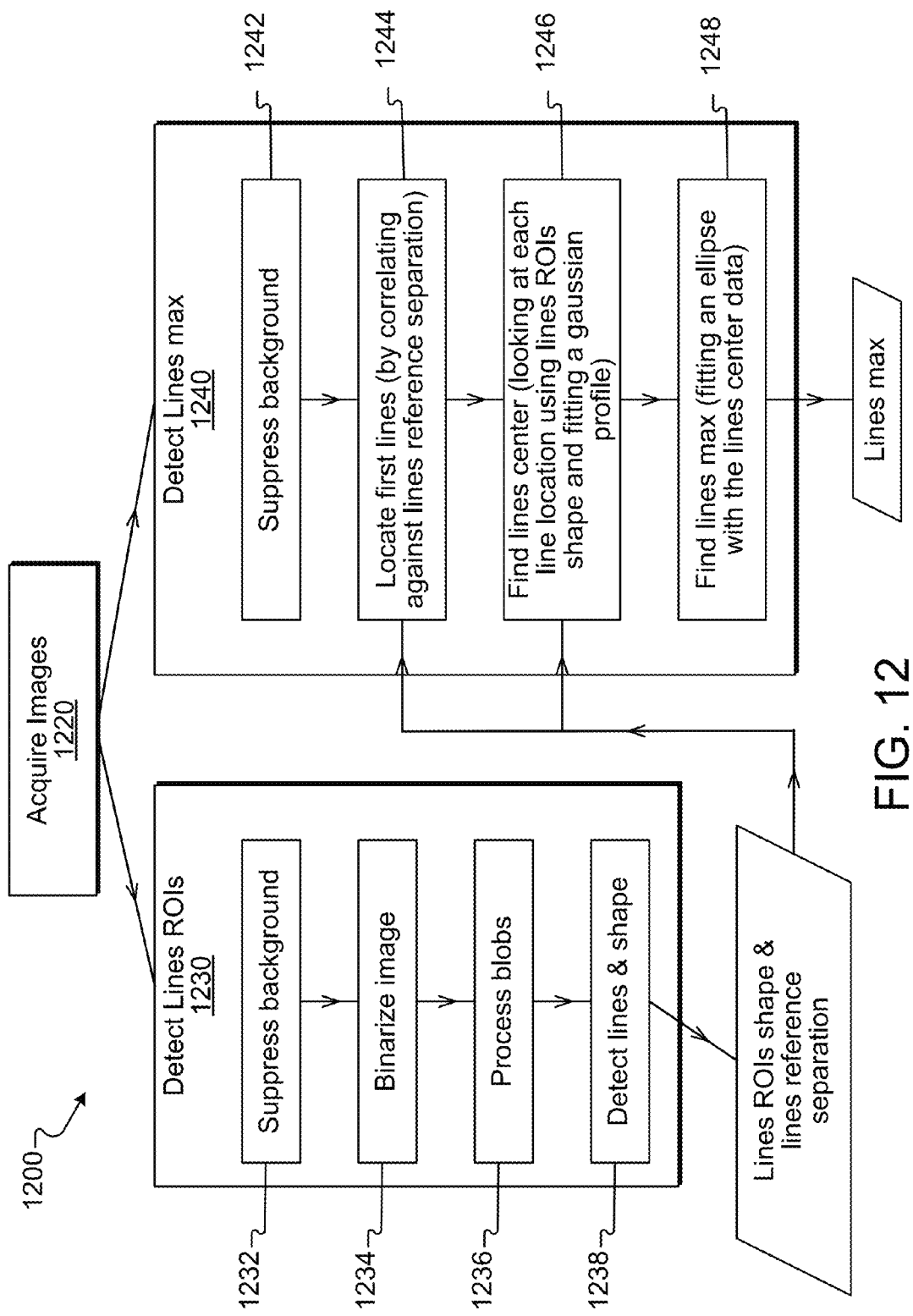
FIG. 12 is a flow chart of another example of a process for measuring straightness of an object.

FIG. 12 is a flow chart of an example of a process 1200 used to detect the maximum of the lines projected on the object. For example, the process 1200 can be implemented, in conjunction with the process 1100, using the system 100 described above in this specification in connection with FIGS. 1-3. For instance, the process 1200 can be performed by the electronic processing module 150 of system 100. As described above in examples illustrated in FIGS. 6-10, a hook end measurement can include M image acquisitions.

At 1220, M of images can be acquired as the object is rotated around a longitudinal axis, for example. These image acquisitions can correspond to operations performed at 1120 as part of the process 1100. An example of an acquired image is shown in panel (a) of FIG. 2.

At 1230, a first of the M acquired images is used to determine separations between lines depicted in the first image, and to obtain shapes of the lines in the first image. The operations performed at 1230 include:

At 1232, a background of the first image is suppressed to increase contrast of the first image. An example of an image for which the background has been suppressed is shown in panel (b) of FIG. 2. At 1234, the first image is binarized to separate regions of the image that potentially contain the curves from the image background. An example of a binarized image is shown in panel (c) of FIG. 2 and in panel (a) of FIG. 14. At 1236, blobs processing is applied to the binarized first image to separate the lines depicted in the first image from noise, e.g., bright pixels in the image that are not part of the lines. At 1238, the lines depicted in the processed first image are identified. In this manner, a reference separation for the identified lines can be determined as a lines reference separation, and a shape of a region of interest (ROI) for the identified lines can be obtained as a lines ROI shape.

In case the quality of the first acquired image prevents determining the lines reference separation and obtaining the lines ROI shape, the operations performed at 1230 can be repeated for a second one of the M acquired images, and so on, as necessary.

At 1240, the lines reference separation and the lines ROI shape generated at 1230 are used to determine line maxima for the lines depicted in each image from among the M−1 remaining ones of the M acquired images, as described above in connection with FIG. 2. In some implementations, the operations performed at 1240 are performed on all M acquired images, as the first image (processed at 1230) can be reprocessed at 1240. The operations performed at 1240, for each image, include:

At 1242, a background of the image is suppressed to increase contrast of the image. At 1244, locations of the lines depicted in the image are detected by correlating against the lines reference separation determined at 1230. At 1246, centers of the lines depicted in the image are found by correlating a Gaussian profile, at each of the detected line locations, and following the lines ROI shape, for example. At 1248, maximums of the lines depicted in the image are found by fitting an ellipse to data corresponding to the line centers.

Figure 13:
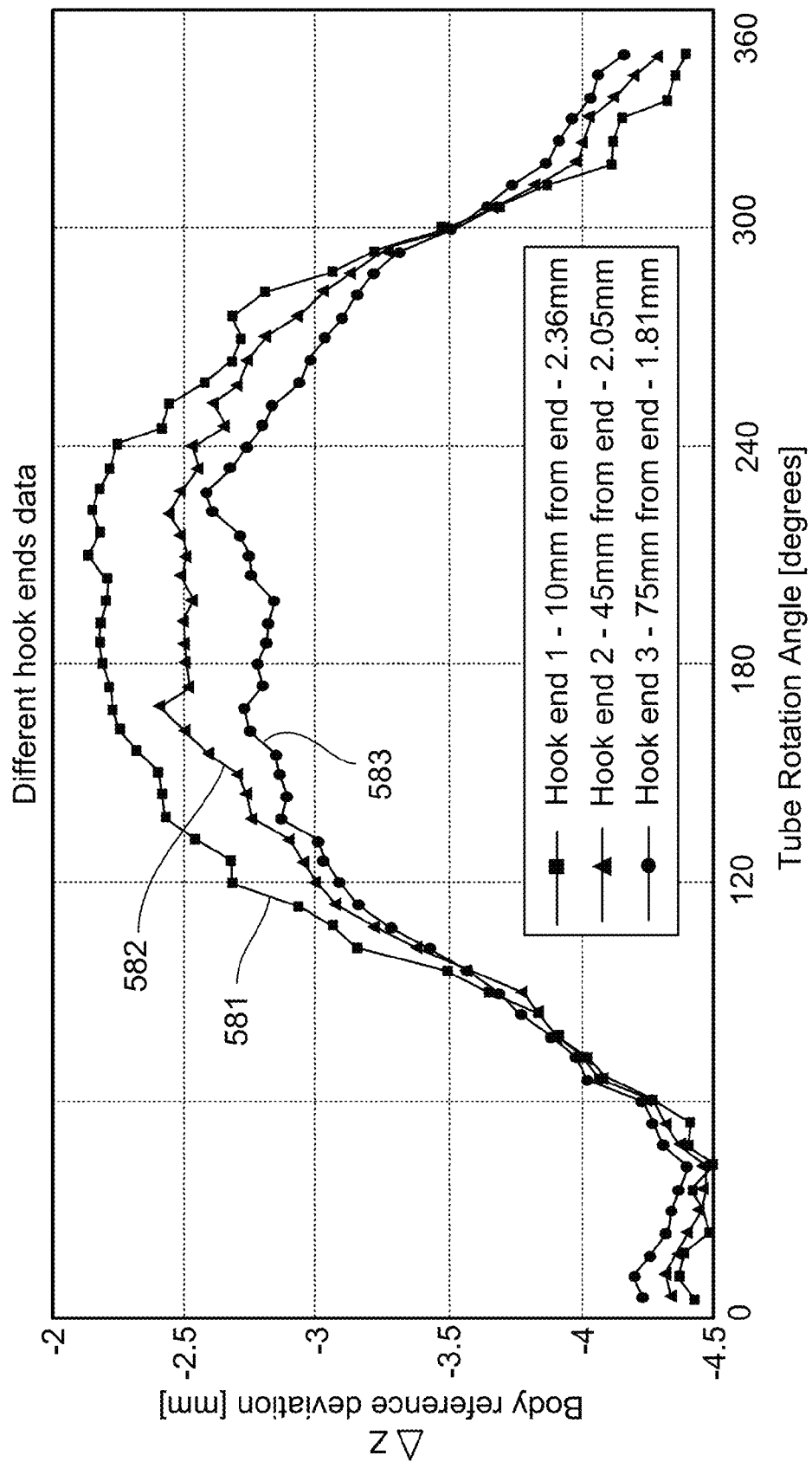
FIG. 13-20 shows measurement results obtained by using systems and techniques for measuring straightness of an object.

FIG. 13 shows examples of measurement results obtained using the process 1100 in conjunction with process 1200. In the example illustrated in FIG. 4, a pipe surface 105 is rotated about a longitudinal axis (e.g., the y-axis). The outer diameter of the pipe is 89 mm. During the rotation, M images of N=15 lines 140 projected on a 450 mm long portion of the pipe surface 105 adjacent to the pipe end 107 are acquired. For instance, M=60 images are acquired for a complete revolution of the pipe surface 105, one image being acquired per angular increment. At each angular incremental, deviation $\Delta Z_1$ of a selected line 141 adjacent to the pipe end 107 with respect to the fitted curve 565 of the last eight lines 145 on the pipe surface 105 is obtained. Graphs 581, 582 and 583 correspond to $\Delta Z_1$, $\Delta Z_2$ and $\Delta Z_3$ deviations measured for the first three lines, respectively, projected 10 mm, 45 mm and 75 mm from the pipe end 107. The deviations $\Delta Z_1$, $\Delta Z_2$ and $\Delta Z_3$ are represented on the vertical-axis of the graphs 581, 582 and 583. Each $\Delta Z$ deviation (e.g., data point of graphs 581, 582 and 583) is measured when the pipe surface 105 is rotated by an incremental angle of $\Delta\theta=6°$, in this example. The rotation angles of the pipe corresponding the measured deviations $\Delta Z1$, $\Delta Z2$ and $\Delta Z3$ are represented on the horizontal-axis of the graphs 581, 582 and 583. The hook end value is computed, by the electronic processing module 150 for each of the first three lines, as a difference between max and min $\Delta Z$ deviations (calculated as explained above in connection with FIGS. 7 and 10) for a revolution of the pipe.

In addition, measurement results obtained by using the process 1100 in conjunction with the process 1200 can be used to generate more shape-related information in addition to the hook end value.

Figure 14:
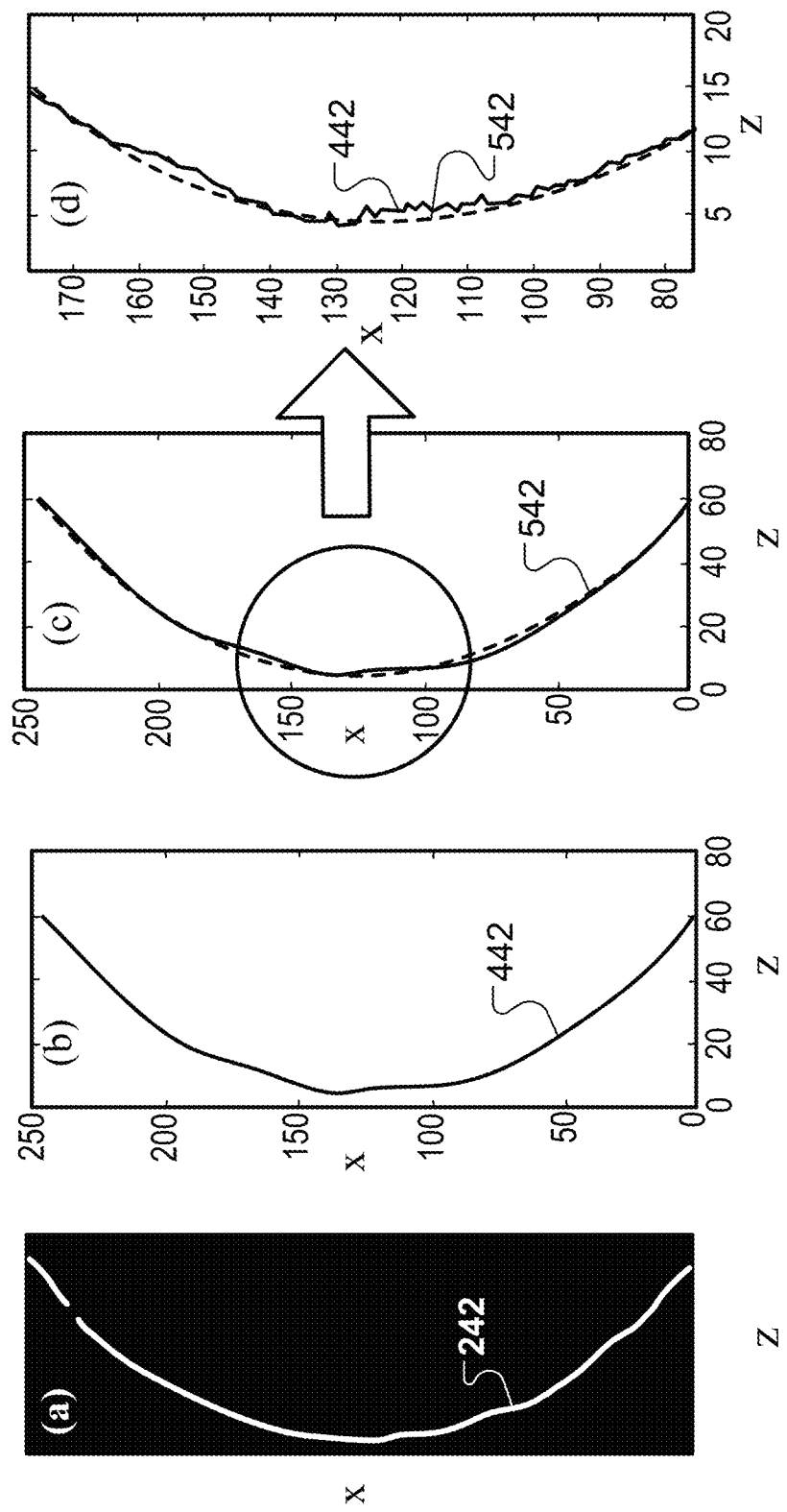

For example, as a part of upsetting an end of a pipe, two lateral fins (called press fins) can be generated near the pipe end. These fins can be removed using a grinding process, but usually some indentations remain and have to be excluded from the measurement of the shape of the pipe end. FIG. 14 shows that the process 1100, in conjunction with the process 1200, naturally filters out the surface deformation corresponding to the press fins. In this example, the outer diameter of the pipe has an outer diameter of 89 mm. A curve 442 (shown in panel (b)) corresponding to an image 242 of a laser line projected over a press fin (shown in panel (a)) is fitted using a fitting curve 542 (shown in panel (c)). The portion of the laser line imaged in panel (a) spans 250 pixels in the transverse direction-x of the pipe and has a rise of 55 pixels in the other transverse direction-z. Inset panel (d) shows a zoomed-in view of the fitting curve 542 (dashed line) that is used to fit the curve 442 corresponding to the laser line image 242. The press fin deformations of the pipe surface are recessed relative to the circular cross-section of the pipe by approximately 2-5 pixels, as shown in the inset panel (d). In contrast with the disclosed measurement techniques 1100 and 1200, an operator generally discards (based on a subjective decision) a deflection result obtained with a manual gage measurement near the fins.

As another example, a Fourier analysis of measurement results obtained using the process 1100 in conjunction with process 1200 can generate additional information of the pipe fabrication process. The results of the Fourier analysis can be used to control the pipe fabrication process, e.g., to improve threading performance and quality of threaded pipes. The Fourier analysis is performed on displacement data measured over a full rotation of the pipe, and results of the Fourier analysis are represented in graph 580, as described above in connection with FIGS. 6-10 and 13.

Figure 15:
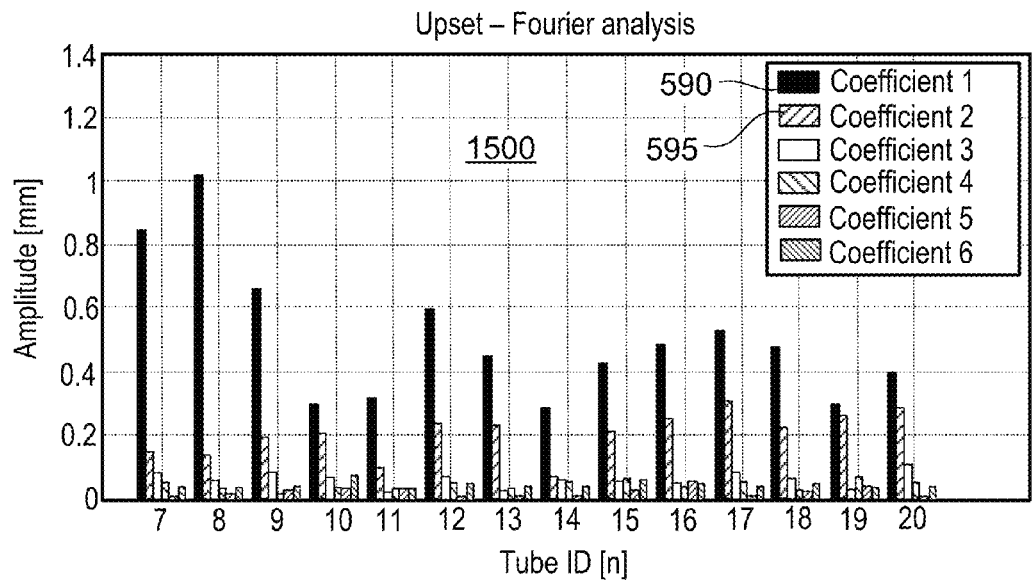
Figure 16:
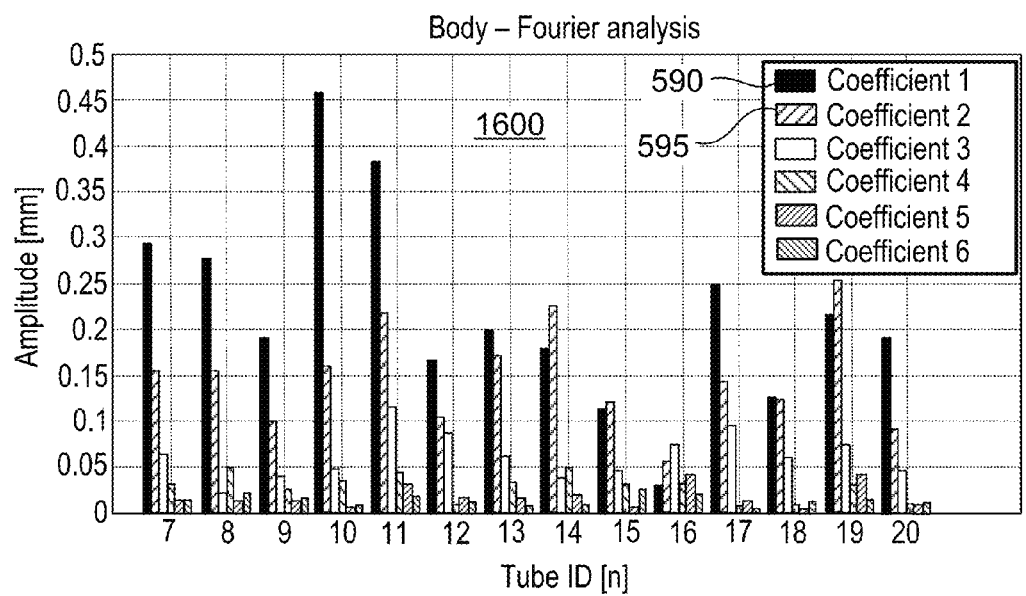

FIGS. 15 and 16 show coefficients of the first six modes obtained as part of the Fourier analysis of straightness measurements of fourteen pipes (Tube IDs from 7 to 20.) The outer diameter of the pipes is about 89 mm. The modes corresponding to the results shown in graphs 1500 and 1600 can be attributed to various aspects of the shape of an upset end portion and a body portion of the pipe surface, respectively. The upset end portion of the pipe surface refers to a locally heated (and dilated), 200 mm-long first portion of the pipe surface adjacent to a pipe end. The body portion of the pipe surface refers to a 200 mm-long second portion of the pipe surface located 250 mm away from the first portion, such that the body portion is cooler than the upset end portion. For example, a first mode 590 corresponds to a deviation of the central axis in the upset end pipe with respect to the body reference line. As another example, a second mode 595 can correspond to a difference between max and min diameter of the upset pipe end with respect to the body reference line. The fact that the first and second modes 590, 595 are larger on the upset end portion of the pipe (as shown in graph 1500) than on the body portion of the pipe (as shown in graph 1600) can be attributed to characteristics of the upsetting process. Higher modes can refer to other characteristics of the pipe fabrication process.

Figure 17:
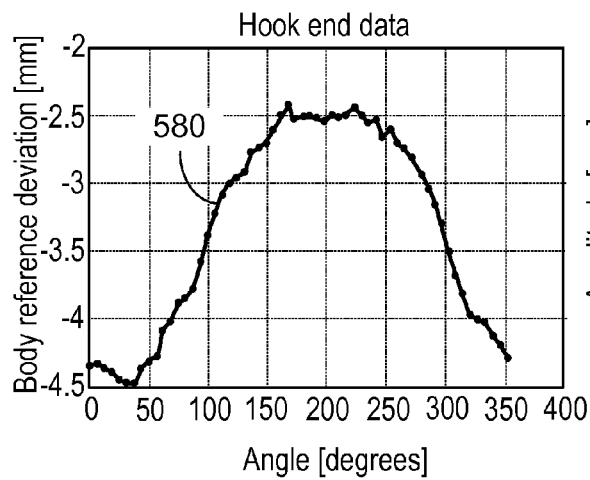
Figure 18:
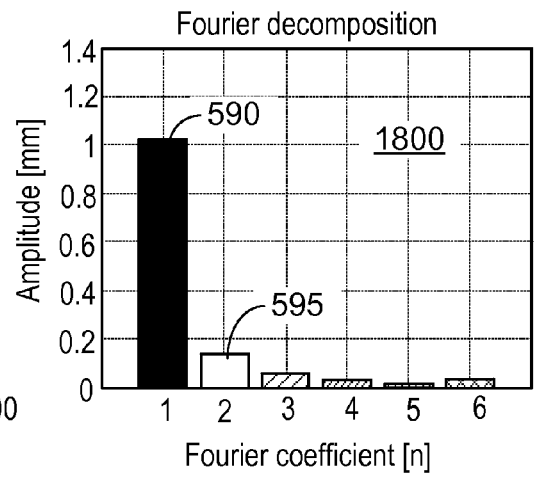
Figure 19:
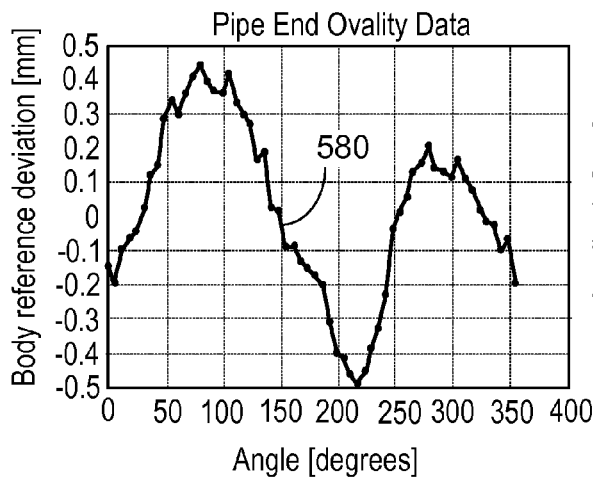
Figure 20:
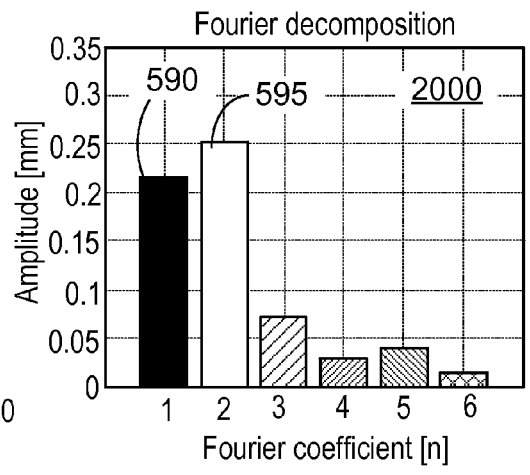

FIGS. 17 and 18 show results of the Fourier analysis performed on a pipe surface that has a hook end. The first six Fourier modes of the $\Delta Z$ deviation 580 are represented in graph 1800. FIGS. 19 and 20 show results of the Fourier analysis performed on another pipe surface that has a pipe end with a transverse cross-section (in the x-z plane) with an oval shape. The first six Fourier modes of the ΔZ deviation 580 are represented in graph 2000. The outer diameter of the pipes is about 89 mm. These Fourier analysis results show that the first mode 590 is dominant for a pipe surface with a hook end, as shown in the graph 1800, and that the second mode 595 is the largest mode for a pipe surface with oval transverse cross-section, as shown in the graph 2000.

Moreover, the system 100 can be used to implement the process 1100 in conjunction with the process 1200 to manufacture a pipe (or a tube, a rod or other linear stock material.) The manufacturing of the pipe includes providing a pre-processed pipe extending along a pipe axis, and measuring straightness of the pre-processed pipe. The straightness measurement includes illuminating the pre-processed pipe with a plurality of lines of light, such that the lines are spaced-apart along the pipe axis, and acquiring a sequence of images of the lines of light while rotating the pre-processed pipe about the pipe axis. Further, the straightness measurement includes, for each image, determining a location of an extremum for each of the lines of light. Furthermore, the straightness measurement includes determining information about the shape of the pre-processed pipe based on the extrema. After the straightness measurement, the manufacturing of the pipe continues by processing the pre-processed pipe based on the information. For example, if the information determined from the straightness measurement indicates that straightness of a pipe end of the pre-processed pipe meets a target tolerance, subsequent processing of the pipe end can include threading the pipe end. As another example, if the information determined from the straightness measurement indicates that straightness of a pipe end of the pre-processed pipe fails to meet the target tolerance, the pre-processed pipe can be routed to repeat at least some of the preprocessing stages of the pipe manufacturing, or the manufacturing of the pre-processed pipe can be halted, at least temporarily.

In general, any of the analysis methods described above, including determining information about the straightness of linear stock material, can be implemented in computer hardware or software, or a combination of both. For example, in some embodiments, the electronic processing module 150 can be installed in a computer and connected to one or more support fixtures, light source modules 110, and image acquisition modules 120, and can be configured to perform analysis of images from the image acquisition modules 120. Analysis can be implemented in computer programs using standard programming techniques following the methods described herein. Program code is applied to input data (e.g., x/y pixels of curves 240 representing images of laser lines 140 projected on the pipe surface 105) to perform the functions described herein and generate output information (e.g., straightness information). The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a computer-readable storage medium, configured with a computer program, where the storage medium so configured causes a computer to operate in a specific and predefined manner to perform the functions described herein.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for determining information about a shape of a pipe, the pipe having a pipe end portion at an end of the pipe and a pipe body extending along a longitudinal axis between ends of the pipe, the method comprising:

projecting a plurality of lines of light onto the pipe, each projected line intersecting a surface of the pipe at a different location along the longitudinal axis, the projected lines being distributed over the pipe end portion and at least some of the pipe body;

acquiring a sequence of images of the surface of the pipe intersected by the projected lines of light while rotating the pipe about the longitudinal axis, each image acquired for a respective pipe rotation angle, wherein pipe rotation angles corresponding to consecutive images are different from each other by a predetermined angular increment;

for each acquired image,
identifying curves corresponding to the projected lines of light on the surface of the pipe;

determining a location of an extremum for each of a first plurality of the curves that are distributed over the pipe body;

establishing a reference line based on the location of the extrema for the first plurality of the curves;

determining a location of an extremum for one of a second plurality of the curves that are distributed over the pipe end portion; and calculating a deviation between (i) the extremum of the one of the second plurality of the curves and (ii) the reference line, the calculated deviation corresponding to the pipe rotation angle for which the image was acquired; and determining information about the shape of the pipe by analyzing a dependence of the calculated deviations on the pipe rotation angles.

2. The method of claim 1, wherein the pipe has an outer diameter in a range of 10-500 mm.

3. The method of claim 1, wherein the pipe has a length in a range of 0.1-50 meters.

4. The method of claim 1, wherein the pipe has a temperature of up to 700 degrees Celsius while the images are acquired.

5. The method of claim 1, wherein the lines of light are formed by diffracting a beam of light.

6. The method of claim 1, wherein the projecting of the lines of light on the pipe is along directions that are non-normal to the longitudinal axis.

7. The method of claim 1, wherein
the predetermined angular increment is 20 degrees, and
the images are acquired every 20 degrees or less of rotation of the pipe about the longitudinal axis.

8. The method of claim 1, wherein the images are acquired for a complete rotation of the pipe about the longitudinal axis.

9. The method of claim 1, wherein the analyzing of the dependence of the calculated deviations on the pipe rotation angles comprises obtaining the maximum of the dependence of the calculated deviations on the pipe rotation angles as a measure of a hook end of the pipe.

10. The method of claim 1, wherein the determined information about the shape of the pipe comprises a measure of an ovality of a transverse cross-section of the pipe.

11. The method of claim 1, further comprising determining information about a defect in the surface of the pipe by analyzing the dependence of the calculated deviations on the pipe rotation angles.

12. The method of claim 11, comprising removing a defect from the surface of the pipe.

13. The method of claim 1, wherein locating the extrema comprises mathematically fitting each curve and determining the location of an extrema of the fitted curve.

14. The method of claim 13, wherein the fitted curve comprises one of a parabola or an ellipse.

15. The method of claim 1, wherein the analyzing the dependence of the calculated deviations on the pipe rotation angles comprises
performing Fourier analysis on the dependence of the calculated deviations on the pipe rotation angles, and
determining contributions to a Fourier transform of the dependence of the calculated deviations on the pipe rotation angles for different angular frequencies.

16. The method of claim 1, further comprising, prior to acquiring the images, varying a position of the pipe relative to a light source that provides the lines of light and a camera that acquires the images to adjust a position of the curves on the pipe and a field of view over which the images are acquired.

17. The method of claim 1, comprising threading the end of the pipe based on the information about the shape of the pipe.

18. A system comprising:
a light source module comprising a light source;
a camera module comprising a camera;
a support fixture configured to position an object relative to the light source and the camera, the object having an object end portion at an end of the object and an object body extending along a longitudinal axis of the object between ends of the object; and
an electronic processing module in communication with the camera,
wherein, during operation of the system:
the support fixture rotates the object about the longitudinal axis,
the light source module illuminates the object with a plurality of lines of light, the lines of light being distributed over the object end portion and at least some of the object body,
the camera acquires a sequence of images of a surface of the object illuminated with the lines of light while the support fixture rotates the object about the longitudinal axis, each image acquired for a respective object rotation angle, wherein object rotation angles corresponding to consecutive images are different from each other by a predetermined angular increment, and
for each image, the electronic processing module
identifies curves corresponding to the lines of light projected on a surface of the object;
determines a location of an extremum for each of the curves,
establishes a reference line based on the location in the images of the extrema for a first plurality of the curves that are distributed over a body of the object distal from an end portion of the object,
determines a location of an extremum for one of a second plurality of the curves that are distributed over the end portion of the object; and
calculates a deviation between the extremum of the one of the second plurality of the curves and (ii) the reference line, the calculated deviation corresponding to the object rotation angle for which the image was acquired, and then
the electronic processing module analyzes a dependence of the calculated deviations on the object rotation angles to determine information about a shape of the object.

19. The system of claim 18, wherein the light source module comprises a diffraction grating positioned between the light source and the support fixture, the diffraction grating being structured to diffract light from the light source to provide the plurality of lines of light.

20. The system of claim 18, wherein the light source is a laser light source.

21. The system of claim 18, wherein the camera module comprise a filter positioned between the camera and the support fixture, the filter being structured to transmit light from the light source reflected from the object to the camera.

* * * * *